Patented Apr. 19, 1927.

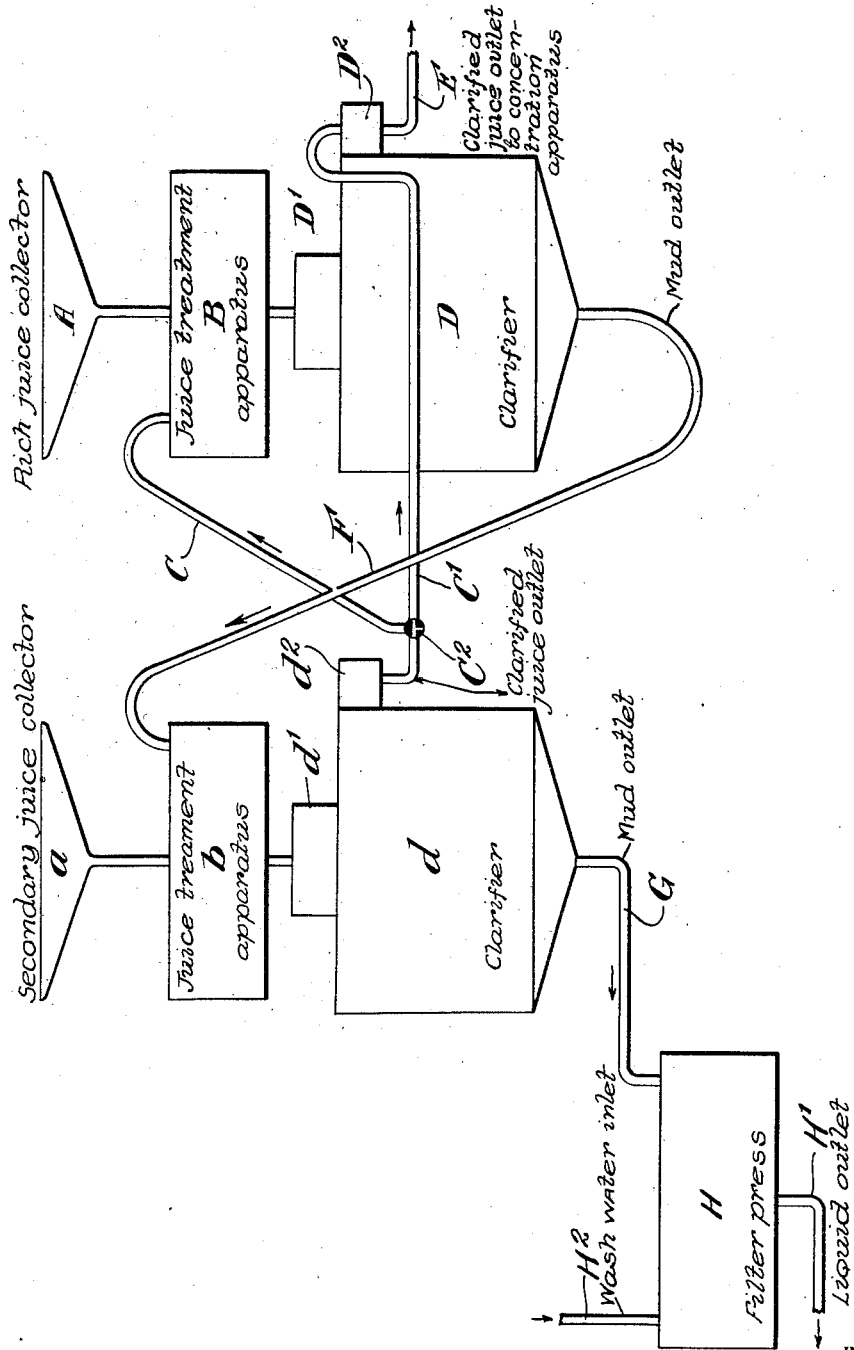

1,625,680

UNITED STATES PATENT OFFICE.

CUTHBERT GEORGE PETREE, OF NEW YORK, N. Y., ASSIGNOR TO PETREE & DORR ENGINEERS, INC., OF NEW YORK, N. Y., A CORPORATION OF CUBA.

PROCESS OF RECOVERING SUGAR CONTENT IN CANE JUICES.

Application filed April 20, 1925, Serial No. 24,395, and in Union of South Africa August 18, 1924.

The present invention consists in an improved method of treating the rich juice and the more dilute juice obtained from the primary and subsequent sections, respectively, of a sugar cane milling circuit, with the general object of separating the juices into a well clarified and relatively rich or dense juice component in desirable condition for concentration, and a sediment content, usually called mud, the sucrose content of which is recovered in a filter press, and which because of its relatively low sugar content and other physical characteristics, is well adapted for filter press treatment with the production of a firm open press cake from which the sugar content of the mud can be readily separated.

Stated differently and somewhat more specifically, the invention consists in a novel method of separating the sediment or mud from the richer and more dilute juices obtained from the primary and secondary sections of the cane juice milling circuit; and the invention is characterized by the steps taken to reduce the richness of the sugar juices forming the juice vehicle admixed with the solids and semi-solids forming the mud or sediment passing to the filter press, and by the relatively open and granular character of the filter press cake produced in consequence of the special manner in which the mud is separated from the clarified sugar juices, and by the double treatment with chemicals and/or heat to which the more dilute juices are subjected in the process.

The accompanying drawing is a diagrammatic representation of apparatus for use in preferred modes of practicing the invention.

In the drawing, A represents the primary rich juice collector underlying the primary section of a cane milling circuit, and $a$ is a secondary juice collector receiving the more dilute juice produced by maceration with water or dilute juices expressed from the cane in the later stages of the milling circuit. The rich raw juice from the collector A passes to a treatment apparatus B which also receives through the conduit C the secondary juice after the latter has been preliminarily clarified as hereinafter explained. The juice mixture thus passing to the apparatus B is subjected therein to a chemical action or to a heating action, or preferably, in most cases to both actions, to coagulate albuminoids and to give the proper acidity or alkalinity to the clarified juices separated from the sediment in the clarifier D to which the juices pass through the inlet or feed chamber $D'$. The clarifier D may be a Dorr decanter, or of other suitable type, and is provided with a clear juice outlet or collecting chamber $D^2$ from which the clarified juice passes through a conduit E to the concentration apparatus.

The mud separated from the juice in the clarifier D is passed from the bottom of the latter through the conduit F to the treatment apparatus $b$ which receives the raw secondary juice from the secondary juice collector $a$. In the apparatus $b$ the mixture of raw secondary juice with the mud from the clarifier D is subjected to suitable chemical and/or heat treatment. The mixture of secondary juice and primary mud then passes to the feed or inlet chamber $d'$ of a clarifier $d$ of suitable type, and ordinarily similar to the clarifier D. The clarifier $d$ is provided with a clear juice chamber $d^2$ from which the clarified juices pass through the conduit C to the treatment apparatus B. The sediment separated from the juice in the clarifier $d$ passes from the bottom of the latter through the conduit G to the filter press H which may be be of any usual and suitable type, $H'$ and $H^2$ conventionally representing the liquid outlet and wash water inlet, respectively, of the filter press. The juices extracted from the mud in the filter press H can be utilized in any usual or suitable manner, and in particular, can be returned to the milling circuit for use as maceration liquid with the ultimate recovery of their sucrose content from the juice passing into the secondary juice collector $a$, or can be added to the juice mixture treated in the apparatus $b$.

By proceeding in the manner described, a number of important practical advantages are obtained. The fact that the juice vehicle which with the solids and semi-solids form the mud passing from the clarifier $d$ to the filter press H, is secondary juice, and neither primary juice nor a mixture of secondary and primary juices, desirably reduces the amount of sugar content in the mud passing to the press and in addition facilitates the extraction of the sugar content of the mud in the filter press H. The double settlement or decantation to which the sediment separated from the primary and secondary juice mixture in the clarifier D is subjected, of itself tends to the production of a filter press cake of a desirably open granular form, as well as augmenting and speeding up the settlement out of the more dilute and less dense secondary juice of the sediment initially contained therein.

As will be seen from the diagram the whole of the clarified juice is ultimately delivered to the concentration plant from the primary clarifier D and the chemical treatment of the juices in the apparatus B can therefore be controlled (usually to a slightly alkaline reaction) to give the greatest clarifying effect thus best fitting the juice to boiling house requirements, regardless of the character of the mud produced in clarifier D; and as the whole of the mud from both rich and dilute juice is ultimately delivered from the secondary clarifier "$d$," the chemical treatment of this secondary juice in the apparatus $b$ can be controlled (usually to a slightly acid reaction) to give the greatest consolidating effect on the stabilized secondary mud so formed, regardless of the clarity and chemical character of the decanted juice obtained from the clarifier $d$, as that juice is later on re-treated and re-clarified before final delivery to the concentration plant. The possibility which the invention provides, of subjecting the juice passing away from the clarifier D to the boiling house through the outlet E to a treatment calculated to secure the best results in the boiler house, and at the same time subjecting the mud passing finally from the clarifying apparatus through the outlet G to a treatment adapted to give the best results in the filter press operation constitutes an important practical advantage. Other things being equal, the clearer the juice passing to the boiling house, the better are the results obtained in the boiling house, whereas the best results from the standpoint of filter press operation are ordinarily secured with the use of less lime for defecation than is required to secure maximum juice clarification. With the present invention the treatment in the apparatus $b$ may be carried out with the primary object of obtaining mud of a character insuring a desirable and efficient filter press operation, and if this results in some cloudiness of the juice leaving the clarifier $d$, that juice can receive whatever additional clarification is required in the clarifier D.

The invention thus makes it possible to finally collect the mud or sediment under the conditions most favorable for the preparation of a filter press cake, initially low in sugar content and of a granular and relatively stable character, which can be freely and rapidly divided in the filter press into a firm dry cake and a clear filtrate. Unless a sufficiently firm filter press cake can be formed, the inevitable sucrose loss from the juices entrapped with the impurities is objectionably large.

With the character of the mud thus produced, a relatively small amount of wash water, and indeed in some cases no wash water at all, need be supplied to the filter press. By proceeding in accordance with the present invention, a mud suitable for treatment in a filter press may thus be produced without the addition of water to the juices in their clarification and settling.

The improvement in the filter press operation, made possible by the use of the invention, is substantial, and sufficiently so to make it feasible to use filter presses and thus recover the mud in a form available for use as soil enriching compost under conditions which otherwise would make the use of a filter press impractical. The invention for this reason is particularly desirable where compost recovery is desirable with canes carrying an unusually large amount of waxy or gummy matters, or where for other reasons the fouling of the filter press cloths, and the impossibility of producing a firm dry cake except by the use of chemicals of objectionable character, or in undesirable excess for the defecation of the juices and the treatment of the mud, make the use of of a filter press impossible or undesirable from an economical standpoint.

In some cases the clarified secondary juice may be mixed with the primary juice after the latter has been clarified. This may be accomplished by passing the juice from the clear juice chamber $d^2$ of the clarifier $d$ through the pipe branch C' to the clear juice chamber $D^2$ of the clarifier D, a valve $C^2$ being provided to connect either of the pipes C or C' to the chamber $d^2$, as desired. In general, of course, in any given installation, the valve $C^2$ and one or the other of the pipes C and C' would be omitted. While the modification just described obviously permits of the use of a smaller size clarifier D than would otherwise be required, it is open to the objection that richer juices are entrapped in the primary mud collected in the clarifier D, and furthermore, some further precipitation may occur upon admixture of the juices, with resultant trouble due to scale formation on the evaporator heating surface.

Generally speaking, the advantages obtained by proceeding in accordance with the invention as previously explained, are obtained if, as may sometimes be desirable, the mud discharged from the clarifier $d$ through the conduit G is passed not to the filter press H, but to a centrifugal separator in which the solids and juice vehicle contained in the mud are separated and separately recovered.

Having now described my invention, what I claim as new and desire to secure by Letters Patent, is:—

1. The method of treating the rich and weaker juices coming from different stages of a sugar cane milling circuit which consists in decanting the rich juice, adding the mud thereby produced to the weaker juice, then decanting the latter, and separating and separately recovering the solids and juice vehicle constituting the mud produced by the decantation of the weaker juice by subjecting the last mentioned mud to a press action.

2. The method of treating the rich and weaker juices coming from different stages of a sugar cane milling circuit, which consists in decanting the rich juice, adding the mud thereby produced to the weaker juice, then decanting the latter, and subjecting the mud produced in the decantation of the weaker juice to a filter press action.

3. The method of treating the rich and weaker juices coming from different stages of a sugar cane milling circuit, which consists in defecating the raw rich juice with particular reference to boiling house requirements, and mixing the mud thereby separated from the clarified juice with the raw weaker juice, defecating the mixture with particular reference to filter press mud requirements, and filter press treating the mud thereby separated from the weaker juice.

4. The method of treating the rich and weaker juices coming from different stages of a sugar cane milling circuit, which consists in mixing the raw rich juice with previously preliminarily clarified weaker juice, defecating the juice mixture thus formed with particular reference to boiling house requirements, mixing the mud thereby separated from said mixture with the raw weaker juice, defecating the last mentioned mixture with particular reference to filter press mud requirements, and filter press treating the mud separated from the weaker juice preliminarily clarified by the last mentioned defecation.

Signed at New York city, in the county of New York, and State of New York, this 17th day of April, A. D. 1925.

CUTHBERT GEORGE PETREE.